(12) United States Patent
Will, IV et al.

(10) Patent No.: US 10,901,423 B2
(45) Date of Patent: Jan. 26, 2021

(54) GENERATING DRIVING BEHAVIOR MODELS

(71) Applicant: International Business Machines Corporation, Armonk, NY (US)

(72) Inventors: Henry C. Will, IV, Dover, NJ (US); John A. Gunnels, Somers, NY (US); Ramya Raghavendra, White Plains, NY (US); Catherine H. Crawford, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/693,770

(22) Filed: Sep. 1, 2017

(65) Prior Publication Data

US 2019/0072968 A1 Mar. 7, 2019

(51) Int. Cl.
| | |
|---|---|
| *G05D 1/02* | (2020.01) |
| *G05D 1/00* | (2006.01) |
| *G08G 1/16* | (2006.01) |
| *G06N 5/02* | (2006.01) |
| *B60W 40/02* | (2006.01) |
| *G08G 1/01* | (2006.01) |
| *G08G 1/00* | (2006.01) |
| *G06Q 50/30* | (2012.01) |

(52) U.S. Cl.
CPC .......... *G05D 1/0214* (2013.01); *B60W 40/02* (2013.01); *G05D 1/0088* (2013.01); *G05D 1/0276* (2013.01); *G06N 5/025* (2013.01); *G06Q 50/30* (2013.01); *G08G 1/0112* (2013.01); *G08G 1/0129* (2013.01); *G08G 1/166* (2013.01); *G08G 1/205* (2013.01); *G05D 2201/0213* (2013.01)

(58) Field of Classification Search
None
See application file for complete search history.

(56) References Cited

U.S. PATENT DOCUMENTS

| | | |
|---|---|---|
| 6,405,132 B1 | 6/2002 | Breed et al. |
| 8,841,994 B2 | 9/2014 | Li et al. |
| (Continued) | | |

FOREIGN PATENT DOCUMENTS

| | | |
|---|---|---|
| WO | 2013042901 A2 | 3/2013 |
| WO | 2014043301 A2 | 3/2014 |
| (Continued) | | |

OTHER PUBLICATIONS

Wouters et al., "Traffic accident reduction by monitoring driver behaviour with in-car data recorders." Accid Anal Prev., Sep. 2000, 32(5):643-50, Abstract, printed Jun. 2, 2017.
(Continued)

*Primary Examiner* — Suzanne Lo
(74) *Attorney, Agent, or Firm* — Daniel C. Housley

(57) ABSTRACT

A first feature set for an accident is identified, based on one or more historical accident reports. The accident is geolocated to obtain road data for a location of the accident. Weather data for the accident is obtained, based on the accident location. Hidden data for the accident is obtained, based on the accident location and the time of the accident. The first feature set is combined with the road data, weather data, and hidden data to produce a complete feature set for the accident. A model feature set is generated, based on a combination of the complete feature set and a plurality of other complete feature sets produced based on historical accident reports for a plurality of other accidents.

17 Claims, 9 Drawing Sheets

(56) References Cited

U.S. PATENT DOCUMENTS

| | | | |
|---|---|---|---|
| 9,165,477 B2* | 10/2015 | Wilson | G07C 5/008 |
| 9,280,899 B2 | 3/2016 | Biess et al. | |
| 9,773,281 B1* | 9/2017 | Hanson | G06Q 40/08 |
| 10,024,684 B2* | 7/2018 | Wang | G01C 21/32 |
| 10,319,039 B1* | 6/2019 | Konrardy | G06Q 40/08 |
| 2008/0040004 A1 | 2/2008 | Breed | |
| 2015/0294422 A1 | 10/2015 | Carver et al. | |
| 2018/0292835 A1* | 10/2018 | Matus | B60W 50/0098 |
| 2019/0288917 A1* | 9/2019 | Ricci | B60R 16/037 |

FOREIGN PATENT DOCUMENTS

| | | | |
|---|---|---|---|
| WO | WO-2014207558 A2 * | 12/2014 | G07C 5/0841 |
| WO | 2016123424 A1 | 8/2016 | |
| WO | 2016200762 A1 | 12/2016 | |

OTHER PUBLICATIONS

Al-Shihabi et al., "Toward More Realistic Driving Behavior Models for Autonomous Vehicles in Driving Simulators", 82nd Annual Meeting of the Transportation Research Board, Jan. 12-16, 2003, 27 pages.

Bradbury, "Software Predicts When, Where Accidents Occur on Tennessee Highways", Government Technology, Cloud & Computing, Aug. 4, 2014, 6 pages. http://www.govtech.com/computing/GT-Software-Predicts-When-Where-Accidents-Occur-on-Tennessee-Highways.html.

Jayasudha et al., "An Overview of Data Mining in Road Traffic and Accident Analysis", Journal of Computer Applications, vol.-II, No. 4, Oct.-Dec. 2009, 6 pages.

Unknown, "Automatic Congestion-Point Detection and Alerts", ip.com, An IP.com Prior Art Database Technical Disclosure, IP.com No. IPCOM000229420D, IP.com Electronic Publication Date: Jul. 29, 2013, 14 pages.

Unknown, "Usage of Traffic Cameras to detect traffic accidents and to provide data", ip.com, An IP.com Prior Art Database Technical Disclosure, IP.com No. IPCOM000231049D, IP.com Electronic Publication Date: Sep. 24, 2013, 3 pages.

Unknown, "Collective Vehicular Sensing Incorporating a Vehicle's Operational Data as Indirect Sensors", ip.com, An IP.com Prior Art Database Technical Disclosure, IP.com No. IPCOM000216685D, IP.com Electronic Publication Date: Apr. 13, 2012, 4 pages.

* cited by examiner

Prior Art
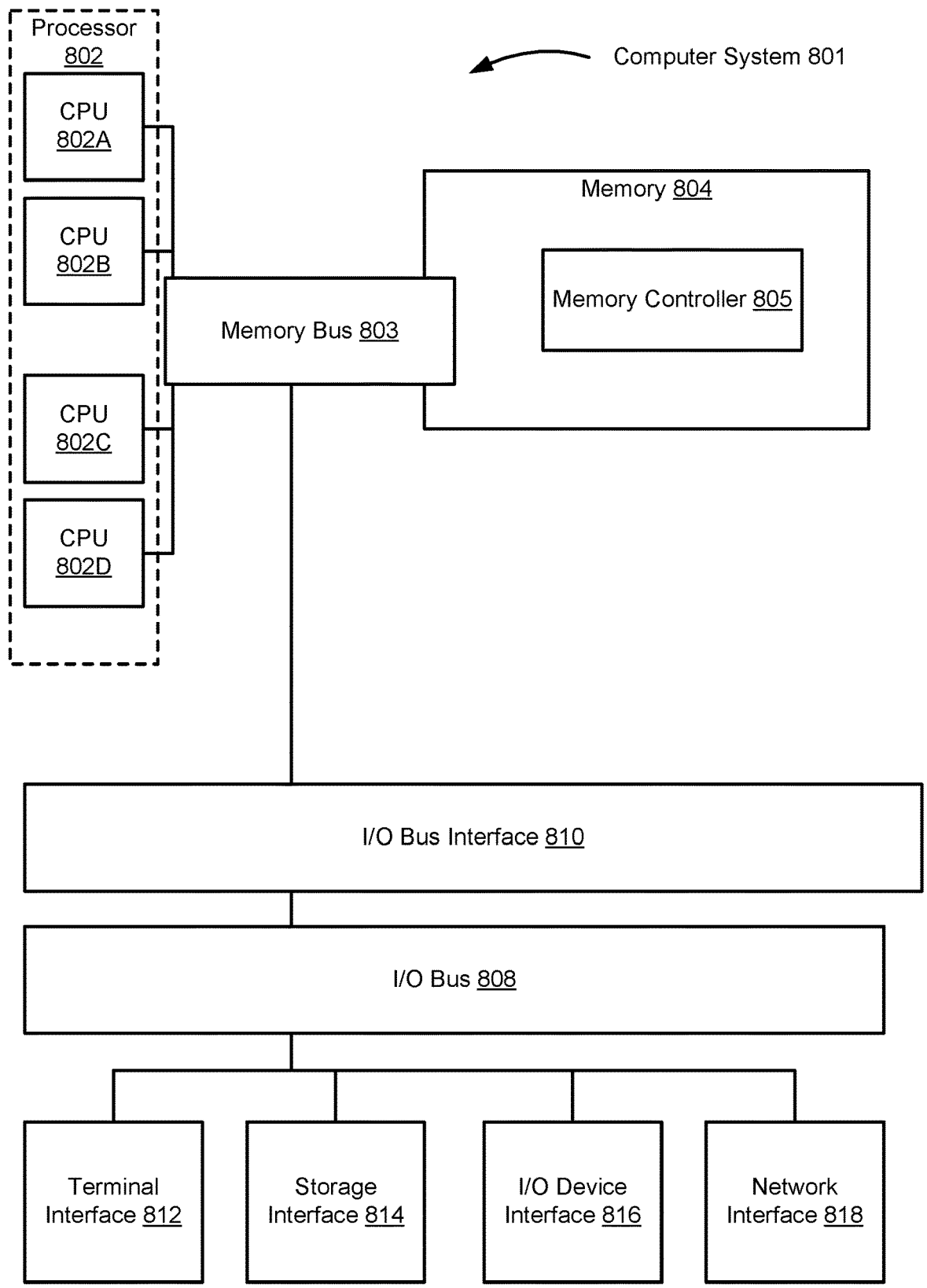
FIG. 8 (Amended)

GENERATING DRIVING BEHAVIOR MODELS

BACKGROUND

The present disclosure relates generally to generating computer models, and more particularly to generating driving behavior models.

Driver-controlled, autonomous, and driving-assisted vehicles have benefited from connections to the cloud for detailed maps and long-term planning. Data collected from these vehicles is also sent to the cloud to improve control loop software in the vehicle (e.g., localization and object avoidance for braking distance calculation) as well as to continually update detailed human-annotated maps. The data to develop autonomous and assisted driving technology largely comes from vehicle manufacturers collecting data from their own vehicles. Autonomous vehicle companies also use passengers in autonomous vehicles to label outcomes of related behaviors of drivers.

SUMMARY

Embodiments of the present disclosure include a method, computer program product, and system for creating driving behavior models.

A first feature set for an accident is identified, based on one or more historical accident reports. The accident is geolocated to obtain road data for a location of the accident. Weather data is obtained, based on the accident location, for the accident. Hidden data for the accident is obtained, based on the accident location and the time of the accident. The first feature set is combined with the road data, weather data, and hidden data to produce a complete feature set for the accident. A model feature set is generated, based on a combination of the complete feature set and a plurality of other complete feature sets produced, based on historical accident reports for a plurality of other accidents.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8 illustrates a high-level block diagram of an example computer system that may be used in implementing embodiments of the present disclosure.

Figure 1:
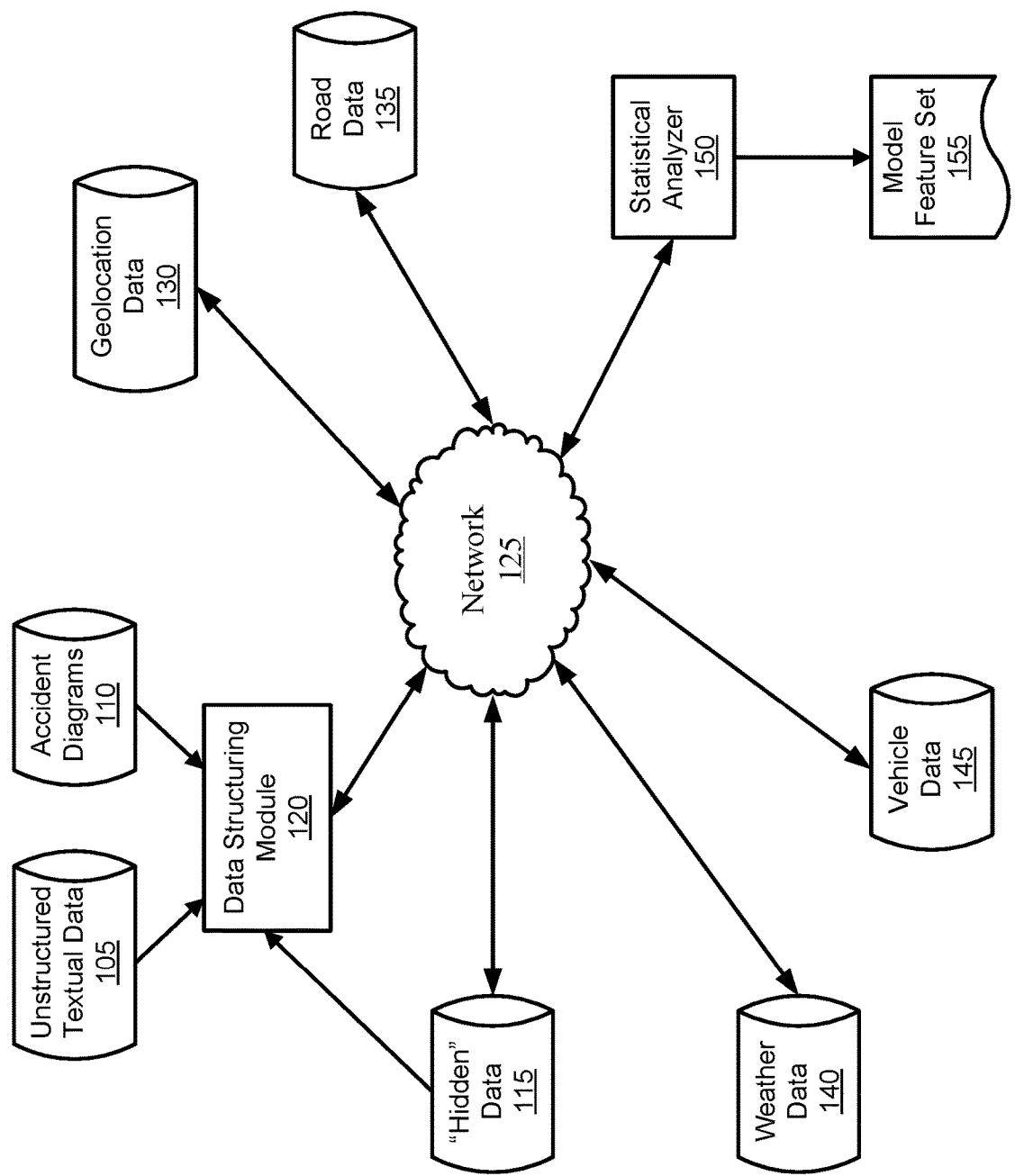
FIG. 1 illustrates a diagram of an example network environment for collecting and structuring data, in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of driving behavior model construction, and more particularly to controlling autonomous vehicles using holistic models. While the present disclosure is not necessarily limited to such applications, various aspects of the disclosure may be appreciated through a discussion of various examples using this context.

As discussed above, the data used in developing autonomous and assisted-driving vehicles comes largely from those vehicles and the manufacturers of those vehicles. There is, therefore, a significant gap in understanding how complex driving control inputs (e.g., driving behaviors) in autonomous vehicles contribute to overall traffic and pedestrian safety, given the enormous amount of traffic accident reports available. Leveraging historical data would help with models on interactions with older vehicles and/or drivers who do not have the resources to purchase an autonomous vehicle or a newer vehicle capable of recording and storing vehicle sensor data. Data related to such drivers are automatically excluded from current methods used in developing autonomous and assisted-driving vehicles.

There has not been a focus, at least for purposes of autonomous vehicle control, on understanding the cause of accidents and developing driving behavior models to avoid them. The present disclosure provides a holistic approach to collecting and employing data to generate more robust massive multi-agent simulation models by learning the multi-dimensional characteristics of accidents. Such models can be utilized not only to control autonomous and assisted-driving vehicles, but also to plan safer and more efficient roads and intersections and to more effectively distribute emergency response resources.

The present disclosure addresses the need to use historical and "hidden" data to learn the causes of accidents to avoid and/or mitigate hazardous driving situations. Identifying the conditions that lead to, or contribute to, accidents (e.g., accident features) allows for augmented dynamic mapping for route planning as well as more robust massive multi-agent simulation models used for designing roads/intersections, routing traffic during construction or traffic jams, distributing emergency response services/resources, predicting outcomes, and controlling autonomous and assisted-driving vehicles in real time.

The present disclosure contemplates the identification and utilization of holistic, multi-dimensional accident data. Not only does the present disclosure contemplate utilization of the data collected from conventional sources (e.g., autonomous vehicles and their manufacturers), but also from historical accident reports (e.g., insurance reports, police reports, etc.), driver records (e.g., driver cohort data, driving histories, etc.), weather data, geolocation and mapping data, traffic statistics, road data, vehicle sensor data, medical records, etc.

Once collected and structured, the holistic data may be statistically analyzed (e.g., using kMeans or other centroid-based clustering, connectivity-based clustering, distribution-based clustering, density-based clustering, etc.) to determine which features or characteristics of accidents may be associated with various outcomes (e.g., a high or low degree of accident incidence, accident severity, etc.). For example, icy roads may be associated with more accidents as well as more severe accidents, a certain intersection design may contribute to accident frequency, etc. Once identified and characterized, these features, and their correlations to outcomes, may be used to build models for conducting traffic simulations, designing roads and intersections, designing vehicles, training drivers, and controlling autonomous and assisted-driving vehicles. Models may be implemented using recursive neural networking, finite state machines, rules-based or probabilistic approaches, deep learning, or other techniques. Because the model is constructed with a holistic and multi-dimensional set of data, the model will have a greater ability to identify and consider previously-undiscovered or under-considered accident characteristics.

In embodiments, models generated by the present disclosure may determine that, in a particular situation (e.g., given a particular set of features/driving conditions), avoiding an accident is unlikely or impossible. In such situations, a set of "lesser-evil" driving behaviors may be identified and utilized by an autonomous or assisted-driving vehicle to mitigate the damages (e.g., the outcomes) of an imminent accident. The statistical methods mentioned above may further rank/weight accident features and/or driving behaviors, which may be instructive in determining the "least-evil" set of driving behaviors that an autonomous vehicle can execute in a given situation. Factors used to rank/weight features/behaviors may include the strength of the feature's correlation to a particular outcome, economic cost of the outcome, potential personal/medical injuries, possibility of fatality, etc. In embodiments, data collected from vehicles that were nearby, but not necessarily involved in, an accident may be used to identify driving behaviors that may successfully avoid or mitigate accident-related damages.

In embodiments, data relating to uncommon features (e.g., remote or infrequently-used roads and/or intersections, uncommon vehicle types, etc.) may be difficult or impossible to collect. Using the methods of the present disclosure, features of roads/intersections/uncommon vehicles/etc. that are similar to those uncommon features may be used, independent of their native geolocation or other attributes, to generate appropriate models.

As discussed above, aspects of the disclosure may relate to field of driving behavior model construction, and more particularly to controlling autonomous vehicles using holistic models. Accordingly, an understanding of the embodiments of the present disclosure may be aided by describing embodiments of natural language processing and other data-structuring systems (e.g., systems that convert unstructured, raw data into structured, machine-useable data) and the environments in which these systems may operate. Turning now to the figures, FIG. 1 illustrates a diagram of an example network environment 100 for collecting and structuring data, in which illustrative embodiments of the present disclosure may be implemented.

Example network environment 100 may include a plurality of data sources, such as a source of unstructured textual data 105, accident diagrams 110, "hidden" data 115, geolocation data 130, road data 135, weather data 140, and vehicle data 145. In certain embodiments, the data sources (e.g., unstructured textual data 105, accident diagrams 110, "hidden" data 115, geolocation data 130, road data 135, weather data 140, vehicle data 145) may reside in the storage of a single device, or may be distributed across the storage of a plurality of devices. Data collected from the data sources may include historical data (e.g., data corresponding to the time and location of an accident). In embodiments, a single type of data (e.g., weather data) may reside in the storage of a single device, or may reside in the storage of several devices connected either locally or remotely via a network, such as network 125. In embodiments, the data sources and other devices connected to network 125 may be local to each other, and communicate via any appropriate local communication medium.

Unstructured textual data 105 may include historical accident reports, or any other type of textual data contemplated by the present disclosure. Unstructured textual data 105 may include, for example, an accident report submitted to an insurance company, an accident report created by local traffic or police authorities or a geopolitical institution (e.g., a municipality), etc. In embodiments, unstructured textual data may include audio data (e.g., audio recordings of driver or eye-witness statements) or posts to social media.

Accident diagrams 110 may include visual accident reports, or any other type of visual data contemplated by the present disclosure. Accident diagrams may include, for example, diagrams of accidents submitted within accident reports to an insurance company or visual diagrams submitted as part of a report created by local traffic or police authorities. Accident diagrams may further include visual data (e.g., images or videos) from, such as visual data captured by traffic cameras, vehicles or bystanders to accidents, security cameras of nearby businesses, etc.

"Hidden" data 115 may include data relevant to the present disclosure that is not collected by conventional methods for generating driving behavior models. "Hidden" data 115 may include, for example, medical reports for individuals involved in an accident; driving records for individuals involved in an accident; vehicle sensor data from vehicles near, but not necessarily involved in, an accident; speed limits; or any other data relevant to the creation of robust models for generating driving behavior models that is not contained in reports of other data types discussed herein. "Hidden" data may be structured, or it may be unstructured data that must be converted into structured data prior utilization by a computer system, such as statistical analyzer 150.

Data structuring module 120 may include, or be a part of, a device for converting unstructured, raw data (e.g., textual data, images, videos, sound recordings, etc.) into structured data (e.g., machine-readable data) that a computer system may utilize.

Geolocation data 130 may include data relevant to the location of an accident. For example, geolocation data 130 may include GPS coordinates or maps for identifying or determining the location of an accident, and/or the layout or design of an intersection, road, interchange, etc.

Road data 135 may include data regarding road conditions related to an accident. For example, road data 135 may include information regarding the material composition of a particular road, road construction information (e.g., whether road construction was being performed at an accident site, what type of construction was being performed, etc.), the status of the road (e.g., information regarding the maintenance/upkeep of the road; whether there were potholes, cracks, or other structural impairments; etc.), obstructions, etc.

Weather data 140 may include any data regarding the ambient weather and/or meteorological conditions at the time of an accident. For example, weather data 140 may include temperatures, visibility conditions, precipitation conditions (e.g., snowing, raining, sleeting, hailing, etc.), the presence of water/ice on the road, dew point, humidity, wind speed and direction, or any other weather data relevant to generating a driving behavior model.

Vehicle data 145 may include data collected from the vehicles involved in an accident. For example, newer vehicles may store, or report in real-time, data which may be collected/retrieved, regarding the speed at which the vehicle was traveling, when and with what force brakes were applied, whether the vehicle experienced a malfunction, whether the ABS system engaged, the orientation of the steering wheel, or any other data collectable from the vehicle and its sensors. In embodiments, vehicle data for older vehicles that do not store such data, and to supplement vehicle data for newer vehicles that do, may be inferred or collected from other data types, such as data collected from nearby vehicles, visual data collected from traffic cameras, accident reports, etc.

In some embodiments, the various data sources, the data structuring module 120 and the statistical analyzer 150 may be connected via network 125. The network 125 can be implemented using any number of any suitable communications media. For example, the network 125 may be a wide area network (WAN), a local area network (LAN), an internet, or an intranet. For example, the data structuring module 120 and statistical analyzer 150 and one or more data sources may communicate using a local area network (LAN), one or more hardwire connections, a wireless link or router, or an intranet. In some embodiments, the data structuring module 120 and statistical analyzer 150 and one or more data sources may be communicatively coupled using a combination of one or more networks and/or one or more local connections. For example, the data structuring module 120 may be hardwired to the statistical analyzer 150 (e.g., connected with an Ethernet cable) while the data sources (e.g., unstructured textual data 105, accident diagrams 110, "hidden" data 115, geolocation data 130, road data 135, weather data 140, vehicle data 145) may communicate with the data structuring module 120 and statistical analyzer 150 using the network 125 (e.g., over the Internet).

In some embodiments, the network 125 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 125.

In embodiments, data structuring module 120 and/or statistical analyzer 150 may employ "crawlers" or "scrapers" to access the various data sources to mine relevant data at particular intervals, or in real-time. Crawlers/scrapers may be configured to "patrol" in search of relevant data (e.g., accident reports, weather reports, road data reports, etc.) in the data sources, such as unstructured textual data 105, accident diagrams 110, "hidden" data 115, geolocation data 130, road data 135, weather data 140, and vehicle data 145. For example, a crawler may be configured to identify and retrieve accident reports for a particular intersection, to identify and retrieve weather data for a particular location, to identify and retrieve driving records for a particular demographic or a particular individual, etc. Crawlers may be configured to "crawl" through a database or data source at a given interval, and/or to retrieve documents that have been updated or modified subsequent to a previous retrieval. A document fitting the crawler's parameters may be retrieved, and if needed, analyzed and converted from an unstructured state into a structured state via data structuring module 120.

In embodiments, structured data may be said to contain sets of features (e.g., events preceding, attributes, characteristics, etc.) of accidents. The data from each data source may be said to contain a single feature set. For example, the data from the source containing road data 135 may be a first feature set, the data from the source containing vehicle data 145 may be a second feature set, and so on. Once the feature set from each available data source is collected, it may be combined to create a complete feature set.

A complete feature set (e.g., a set of all features related to a particular accident) may be utilized by statistical analyzer 150, using the methods described herein (e.g., kMeans clustering), to determine correlations between features (e.g., characteristics, attributes, conditions, etc.) of an accident and outcomes (e.g., damages, severities, fatalities) of that accident. For example, statistical analyzer 150 may identify that low tire pressure may increase both the likelihood that an accident will occur, as well as increase the likelihood that an accident may result in serious injury to either property or persons.

In embodiments, statistical analyzer 150 may generate a model feature set 155. Model feature set 155 may consider all the accident features (e.g., a plurality of complete feature sets) that correlate to an increase in the likelihood an accident will occur and/or a likely increase in the severity of the accident. Particular features within the model feature set 155 may be weighted. For example, snowy weather may have a stronger correlation to accident frequency and/or severity than rainy weather, therefore a feature representing snowy weather may be weighted to represent a stronger correlation to accident outcomes than a feature for rainy weather. Feature weighting may be implemented using an array of values, by manipulating the weights and/or biases applied to a recursive neural network, or by conventional means well-known in the art.

Figure 2:
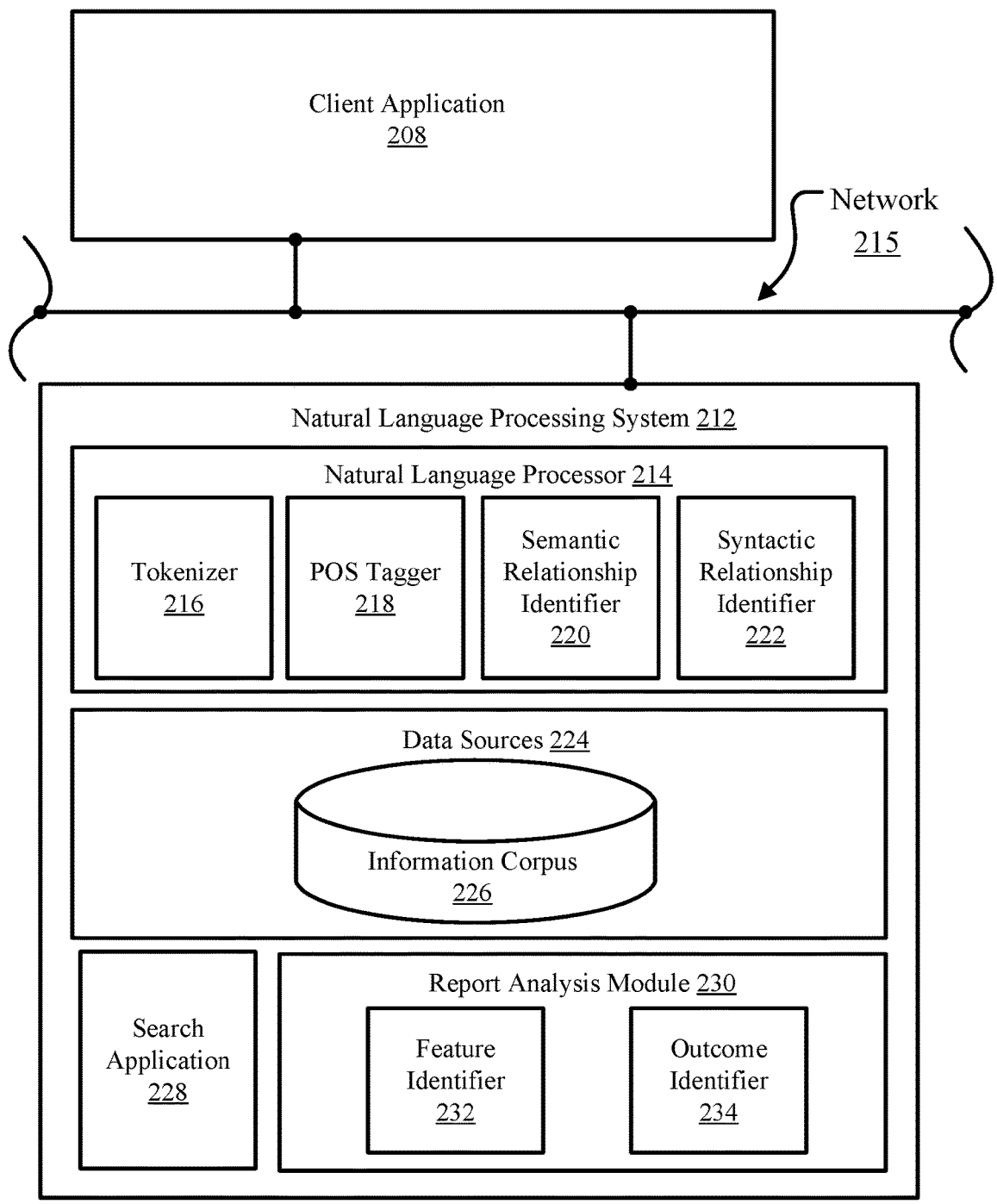
FIG. 2 illustrates a block diagram of an example natural language processing system configured to analyze an unstructured textual accident report, in accordance with embodiments of the present disclosure.

Turning now to FIG. 2, illustrated is a block diagram of an example natural language processing system configured to analyze an accident report, or any other report with unstructured textual data, in accordance with embodiments of the present disclosure. In some embodiments, a remote device (such as a device containing one or more of the data sources described in FIG. 1) may submit electronic documents (such as textual accident reports, or other unstructured textual reports) to be analyzed to the natural language processing system 212 which may be a standalone device, or part of a larger computer system. Such a natural language processing system 212 may include a client application 208, which may itself involve one or more entities operable to generate or modify information in the unstructured textual report(s) that is then dispatched to a natural language processing system 212 via a network 215.

Consistent with various embodiments, the natural language processing system 212 may respond to electronic document submissions sent by a client application 208. Specifically, the natural language processing system 212 may analyze a received unstructured textual report (e.g., an accident report, weather report, etc.) to identify a feature or feature set (e.g., one or more characteristics of the report, such as ambient temperature, precipitation, speed of a vehicle, direction of travel, age of a driver, etc.), and an outcome describing, e.g., whether the feature or feature set is related to an accident and the severity of the accident. Accident severity may be determined by, for example, economic damages (e.g., damage to vehicles, property, land features, structures, etc.) and/or personal or medical damages (e.g., driver or passenger injuries, bystander injuries, hospitalization bills, fatalities, etc.). In embodiments, medical damages may be weighted or prioritized for greater consideration compared to economic damages. In embodiments, the reference information for the value of medical injuries, similar to those used in workers' compensation cases, may be used to determine the value of injuries. In some embodiments, the natural language processing system 212 may include a natural language processor 214, data sources 224, a search application 228, and a report analysis module 230. The natural language processor 214 may be a computer module that analyzes the received unstructured textual reports and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of electronic documents. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one accident report may shed light on the meaning of text elements in another accident report, or the content of a weather report may shed light on the meaning of text elements in an accident report, etc.). In embodiments, the output of the natural language processing system 212 may populate a text index, a triple store, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse a document and generate corresponding data structures for one or more portions of the document. For example, in response to receiving an unstructured textual report at the natural language processing system 212, the natural language processor 214 may output parsed text elements from the report as data structures. In some embodiments, a parsed text element may be represented in the form of a parse tree or other graph structure. To generate the parsed text element, the natural language processor 214 may trigger computer modules 216-222.

In some embodiments, the output of natural language processor 214 may be used by search application 228 to perform a search of a set of (i.e., one or more) corpora to retrieve one or more features, or sets of features, and one or more associated criteria to send to an image processing system and to a comparator. A comparator may be, for example, a statistical analyzer, such as statistical analyzer 150 of FIG. 1. As used herein, a corpus may refer to one or more data sources, such as the data sources 224 of FIG. 2, or the various data sources described in FIG. 1. In some embodiments, the data sources 224 may include data warehouses, information corpora, data models, and document repositories. In some embodiments, the data sources 224 may include an information corpus 226. The information corpus 226 may enable data storage and retrieval. In some embodiments, the information corpus 226 may be a storage mechanism that houses a standardized, consistent, clean, and integrated list of features. The information corpus 226 may also store, for each feature, a list of associated outcomes. For example, the information corpus 226 may include the types of road compositions (e.g., asphalt, concrete, cement, dirt, etc.) and for each occurrence of each road composition, associated outcomes (e.g., accident with X economic damages, Y personal injury damages, and Z fatalities) may be listed. The data may be sourced from various operational systems. Data stored in the information corpus 226 may be structured in a way to specifically address reporting and analytic requirements. In some embodiments, the information corpus 226 may be a data repository, a relational database, triple store, or text index.

In some embodiments, the report analysis module 230 may be a computer module that identifies a feature and an outcome by analyzing one or more unstructured textual reports (e.g., an accident report, weather report, or any other report with unstructured textual data). In some embodiments, the report analysis module 230 may include a feature identifier 232 and an outcome identifier 234. When an unstructured textual report is received by the natural language processing system 212, the report analysis module 230 may be configured to analyze the report using natural language processing to identify one or more features. The report analysis module 230 may first parse the report using the natural language processor 214 and related subcomponents 216-222. After parsing the report, the feature identifier 232 may identify one or more features present in the report. This may be done by, e.g., searching a dictionary (e.g., information corpus 226) using the search application 228. In embodiments, once a feature is identified, the feature identifier 232 may be configured to transmit the feature to an image processing system (shown in FIGS. 3-4) and/or to a statistical analyzer (shown in FIGS. 1, 3, and 4).

The outcome identifier 234 may identify one or more outcomes (e.g., the type and amount of damages) in one or more unstructured textual reports. This may be done by using the search application 228 to comb through the various data sources (e.g., the information corpus 226 or the data sources discussed in FIG. 1) for information and/or reports regarding various damages (e.g., economic, personal, medical, property, and other damages combined) associated with a particular accident's location, date, drivers, etc. In some embodiments, the list of possible outcomes may be predetermined and information related to the list of outcomes (e.g., damage types, dollar amounts involved, severities, etc.) may be populated as outcome information is retrieved. The outcome identifier 234 may search, using natural language processing, reports from the various data sources for terms in the list of outcomes. After identifying a list of outcomes, the outcome identifier 234 may be configured to transmit the list of outcomes to a statistical analyzer (shown in FIGS. 1, 3, and 4).

Figure 3:
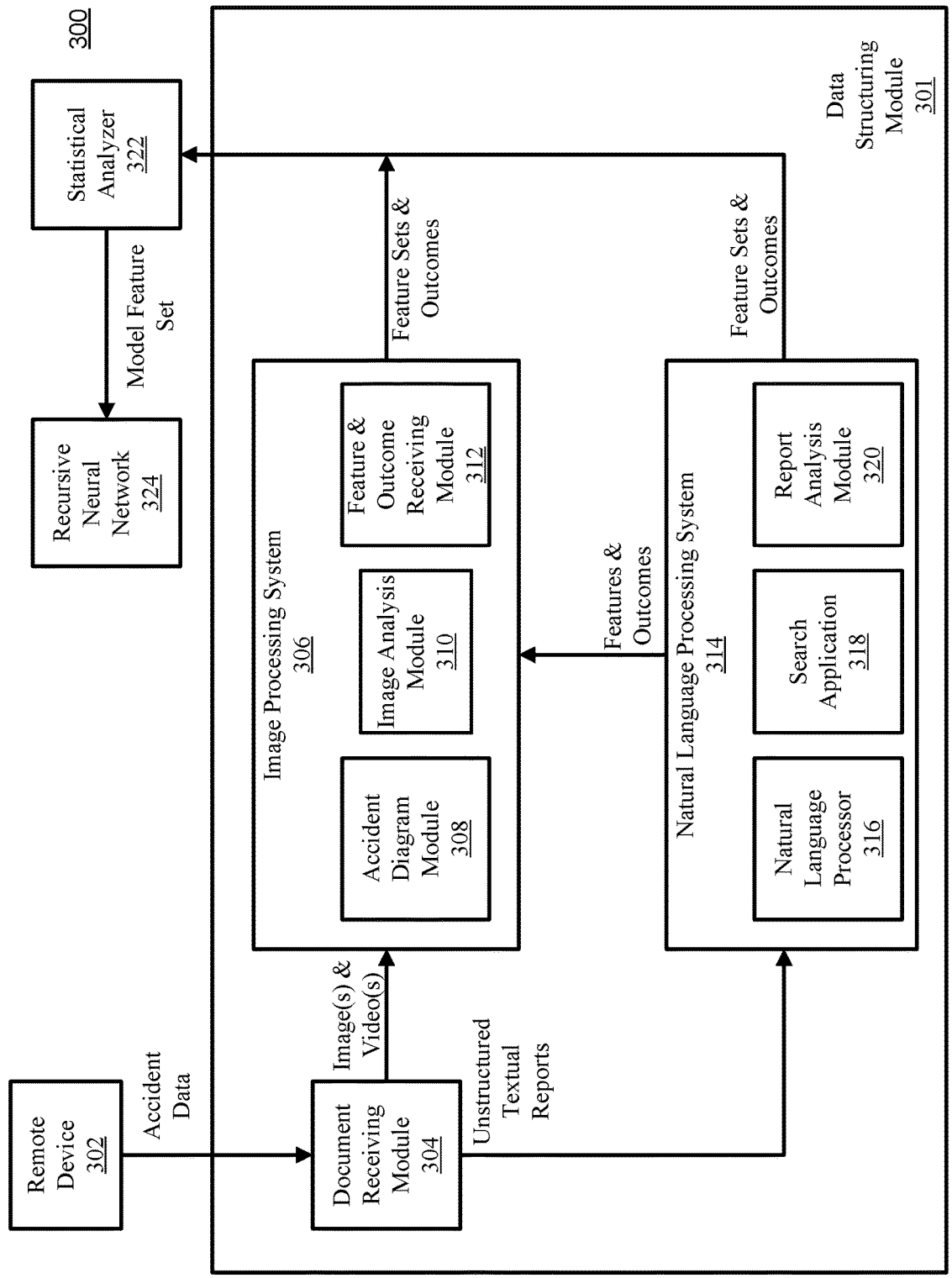
FIG. 3 illustrates a block diagram of an example high level architecture of a system for structuring unstructured textual and visual data, in accordance with embodiments of the present disclosure.

Referring now to FIG. 3, shown is a block diagram of an example high level architecture of a system 300 for structuring unstructured textual and visual data, in accordance with embodiments of the present disclosure. In embodiments, the data structuring module 301 and the statistical analyzer 322 may include the same characteristics as the data structuring module 120 and statistical analyzer 150 of FIG. 1, respectively. A remote device 302 may be substantially similar to one or more of the various data sources described in FIG. 1 and may submit data to a document receiving module 304. The data may include one or more reports and one or more images or videos, such as an accident diagram, video of traffic at an intersection, etc. The document receiving module 304 may be configured to receive the data and to send image(s) and video(s) to the image processing system 306 and report(s) to the natural language processing system 314. In embodiments, some reports (e.g., insurance company reports, police reports, etc.) may contain both images and text; document receiving module 304 may be configured to parse the data to separate the images and text prior to sending the data to the image processing system 306 or to the natural language processing system 314.

In some embodiments, the natural language processing system 314 may include the same modules and components as the natural language processing system 212 (shown in FIG. 2). The natural language processing system 314 may include, e.g., a natural language processor 316, a search application 318, and a report analysis module 320. The natural language processing system 314 may be configured to analyze the textual reports/data to identify one or more features and one or more outcomes relating to the feature(s). After identifying a feature and an outcome, the natural language processing system 314 may transmit the feature and outcome to the image processing system 306. The natural language processing system 314 may also transmit both the feature and the outcome to a statistical analyzer 322. Report analysis module 320 may be substantially similar to report analysis module 230 of FIG. 2.

In some embodiments, the image processing system 306 may include, e.g., an accident diagram module 308, an image analysis module 310, and a feature & outcome receiving module 312. The feature & outcome receiving module 312 may be configured to receive, from the natural language processing system 314, identified features & outcomes determined by analyzing one or more unstructured textual reports that are related to images/videos received from document receiving module 304. Based on digital file formats (e.g., image file formats and video file formats), image processing system 306 may determine with which image processing module (e.g., accident diagram module 308 or image analysis module 310) the system should analyze the image/video received from the document receiving module 304. In embodiments, image processing system 306 may further distinguish accident diagrams from still images using visual object identification techniques well known in the art.

In embodiments, accident diagram module 308 may be configured to recognize, parse, and output structured data representations of hand-drawn and computer-generated accident diagrams, such as, for example, accident diagrams from police reports or insurance company reports. Accident diagrams may show, and the accident diagram module 308 may interpret, the number of vehicles involved in an accident, their direction of travel, speed, the layout of the road or intersection at the site of the accident, the location of damage to vehicles or nearby property or persons, and other characteristics of accident features and/or outcomes.

In embodiments, image analysis module 310 may be configured to recognize accident diagrams, still images, or video of traffic flows and/or accidents and output structured data representations (e.g., machine-readable data) of accident-related data therein. For example, image analysis module 310 may be configured to identify, from a still image, a video, or a single frame of a video feed, features and/or outcomes represented in the image or video (e.g., vehicle makes and models; weather conditions; road conditions; vehicle speeds; vehicles' direction of travel; damage to vehicles, persons, property; etc.).

Feature & outcome receiving module 312 may receive features and outcomes identified by the report analysis module 320. Features and outcomes identified by report analysis module 320 may be related to accident diagrams, images, or video processed by image processing system 306.

For example, a police report for a particular accident may contain unstructured text as well as accident diagrams. Document receiving module 304 may parse the police report and send the unstructured text portion to the natural language processing system 314 and the accident diagrams to the image processing system 312. Feature & outcome receiving module 312 may be configured to receive the features and outcomes identified from the textual portion of the parsed police report and combine them with the features and outcomes identified from the diagrams of that same police report to ensure that a robust set of features and outcomes for the particular accident are identified and grouped together.

After the image processing system 306 has analyzed any received images/diagrams/videos and natural language processing system 314 has analyzed any received unstructured textual reports for a given accident, the complete feature set (e.g., all the feature sets related to a particular accident) and outcomes may be sent to statistical analyzer 322.

In embodiments, as discussed herein, statistical analyzer 322 may determine (e.g., using kMeans or other statistical techniques) which features correlate to which outcomes. For example, it may be determined that tire pressure (e.g., a feature identified from, for example, a vehicle data report containing tire pressure sensor system data) below a certain threshold (e.g., below a certain percentage of the manufacturer's suggested tire pressure, below a certain total tire pressure, etc.) may correlate to an increased risk of a vehicle's chance to overturn (e.g. an outcome), which further correlates to an increase in both vehicle damage (e.g., economic damage) and personal injuries of all occupants of that vehicle (e.g., personal or medical damages). As a result, low tire pressure, as characterized from the data, may be identified as a feature that, when present during, for example, an accident simulation or the operation of a vehicle, increases the likelihood that the vehicle with low tire pressure will overturn and incur damages associated with overturning.

In embodiments, it may be determined that features or characteristics of an intersection or road composition may increase the likelihood an accident will occur, or that an accident will include a particular outcome. Traffic safety may be increased by employing road compositions and intersection designs that incorporate features that correlate to decreased likelihood of an accident, and/or safer outcomes (e.g., outcomes with low damage evaluations).

After statistical analyzer 322 has digested a sufficient number of features and outcomes received from data structuring module 301 (e.g., the number of features and outcomes required for a robust and reliable driving behavior model for executing traffic simulations or to reliably operate an autonomous vehicle), a model feature set may be output to recursive neural network 324. A model feature set may include features from a wide variety of accidents and their associated outcomes. A model feature set may be a static set of data, or it may be dynamically updated "on-the-fly" as statistical analyzer 322 continuously receives additional features and outcomes from data structuring module 301.

In embodiments, recursive neural network 324 may be a multi-layer perceptron, a system of sigmoid neurons, a directed acyclic graph comprising a plurality of corelets, or any other structure/system capable of neural networking.

In embodiments, recursive neural network 324 may be used to conduct simulations of accidents wherein certain parameters of the simulation (e.g. certain features) are defined and/or manipulated by one or more users. Such simulations may be used to determine that novel features (e.g., features not encountered or identified from any reports from the various data sources) or uncommon features may be safer than conventional or common features of intersections, roads, vehicles, etc.

In embodiments, recursive neural network 324 may utilize the model feature set to analyze real-time input received from an autonomous vehicles' sensors and determine which driving behaviors should be employed to grant the vehicle the best chances of avoiding an accident, given the real-time features (e.g., current driving conditions) identified by the vehicles' sensors and other data sources (e.g., weather data sources, traffic cameras, etc.). In embodiments, recursive neural network 324 may determine that no driving behavior or set of driving behaviors is likely to avoid an accident. In such cases, recursive neural network 324 may determine a "lesser-evil" set of driving behaviors (e.g., a set of driving behaviors that will produce features associated with the least-costly outcomes possible) to execute.

Figure 4:
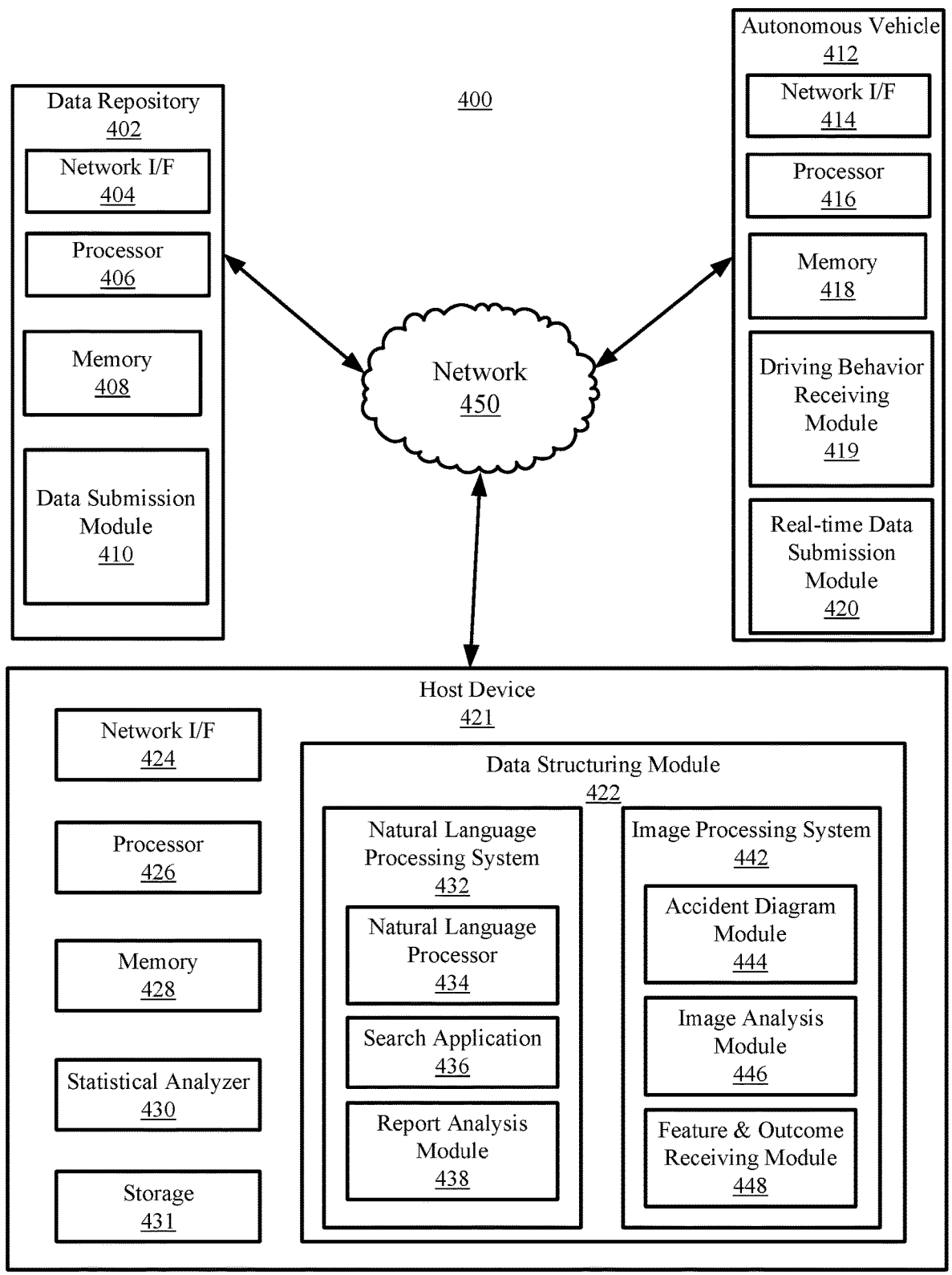
FIG. 4 illustrates a block diagram of an example computing environment for creating driving behavior models and employing them to control an autonomous vehicle, in accordance with embodiments of the present disclosure.

Referring now to FIG. 4, illustrated is a block diagram of an example computing environment 400 for creating driver behavior models and employing them to control an autonomous vehicle, in accordance with embodiments of the present disclosure. Consistent with various embodiments, the host device 421, the data repository 402, and the autonomous vehicle 412 may include, or be, computer systems. The host device 421, the data repository 402, and the autonomous vehicle 412 may include one or more processors 426, 406, and 416 and one or more memories 428, 408, and 418, respectively. The host device 421, the data repository 402, and the autonomous vehicle 412 may be configured to communicate with each other through an internal or external network interface 424, 404, and 414. The network interfaces 424, 404, and 414 may be, e.g., modems or network interface cards. The host device 421, the data repository 402, and the autonomous vehicle 412 may be equipped with a display or monitor (not pictured). Additionally, the host device 421, the data repository 402, and the autonomous vehicle 412 may include optional input devices (e.g., a keyboard, mouse, scanner, or other input device), and/or any commercially available or custom software (e.g., browser software, communications software, server software, speech recognition software, natural language processing software, search engine and/or web crawling software, filter modules for filtering content based upon predefined parameters, etc.). In some embodiments, the host device 421, the data repository 402, and the autonomous vehicle 412 may include or be servers, desktops, laptops, or hand-held devices.

The host device 421, the data repository 402, and the autonomous vehicle 412 may be distant from each other and communicate over a network 450. In some embodiments, the host device 421 may be a central hub from which data repository 402 and autonomous vehicle 412 can establish a communication connection, such as in a client-server networking model. Alternatively, the host device 421, the data repository 402, and the autonomous vehicle 412 may be configured in any other suitable networking relationship (e.g., in a peer-to-peer configuration or using any other network topology).

In embodiments, data repository 402 may be substantially similar to any or all of the various data sources discussed in FIG. 1, data sources 224 of FIG. 2, or remote device 302 of FIG. 3. Data repository 402 may submit data, using data submission module 410, via network 450 to host device 421. Host device 421 may then generate a driving behavior model (e.g., a model employing the model feature set discussed in FIG. 3) to be used in determining the driving behaviors that autonomous vehicle 412 will execute.

In some embodiments, the autonomous vehicle 412 may enable users to submit (or may submit automatically with or without user input) electronic data (e.g., real-time driving data, weather data, road data, geolocation data, etc.) to the host device 421 in order to identify real-time features to utilize in a driving behavior model for determining driving behaviors for autonomous vehicle 412. For example, the autonomous vehicle 412 may include real-time data submission module 420 and a user interface (UI). The UI may be any type of interface (e.g., command line prompts, menu screens, graphical user interfaces). The UI may allow a user to interact with the host device 421 to submit, using the real-time data submission module 420, real-time features (e.g., road and/or driving conditions) to the host device 421.

In embodiments, the host device 421 may include a data structuring module 422. Data structuring module 422 may be substantially similar to data structuring module 120 of FIG. 1, or data structuring module 301 of FIG. 3.

In some embodiments, the data structuring module 422 may include a natural language processing system 432, which may be substantially similar to natural language processing system 212 of FIG. 2 or natural language processing system 314 of FIG. 3. The natural language processing system 432 may include a natural language processor 434, a search application 436, and a report analysis module 438. The natural language processor 434 may include numerous subcomponents, such as a tokenizer, a part-of-speech (POS) tagger, a semantic relationship identifier, and a syntactic relationship identifier.

The search application 436 may be implemented using a conventional or other search engine, and may be distributed across multiple computer systems. The search application 436 may be configured to search one or more databases, as described herein, or other computer systems for content that is related to an electronic document (such as an accident report) submitted by, or retrieved from, a data repository 402. For example, the search application 436 may be configured to search dictionaries, papers, and/or archived accident reports to help identify one or more features, and outcomes associated with the features, in the received accident report. The report analysis module 438 may be configured to analyze an accident report to identify a feature (e.g., a condition with a statistical correlation to either the incidence or outcome of an accident) and an outcome (e.g., a result or damages associated with an accident). The report analysis module 438 may include one or more modules or units, and may utilize the search application 436, to perform its functions (e.g., to identify a feature and an outcome), as discussed in more detail in reference to FIGS. 1-3.

In some embodiments, the data structuring module 422 may include an image processing system 442. The image processing system 442 may be substantially similar to the image processing system 306 of FIG. 3. The image processing system may consider features and outcomes identified by the natural language processing system 432 (e.g., features and outcomes received by the feature & outcome receiving module) when identifying features and outcomes from an image, video, or diagram received or retrieved from data repository 402. The image processing system 442 may utilize one or more models, modules, or units to perform its functions (e.g., to analyze an image/video/diagram and identify feature sets and outcomes). For example, the image processing system 442 may include one or more image processing modules that are configured to identify specific features and outcomes in an accident diagram, traffic image, traffic video, etc. The image processing modules may include an accident diagram module 444 to analyze accident diagrams from insurance and/or police reports to identify features and outcomes (e.g., vehicle makes and models; weather conditions; road conditions; vehicle speeds; vehicles' direction of travel; damage to vehicles, persons, property; etc.). As another example, the image processing system 442 may include an image analysis model 446 to identify features and outcome from still images and/or videos of traffic accidents. In some embodiments, the image processing modules may be implemented as software modules. In some embodiments, accident diagram module 444 and image analysis module 446 may be combined into a single software module or divided among the several components of the host device 421 or the data structuring module 422.

In some embodiments, the image processing system 442 may include a feature & outcome receiving module 448. The feature & outcome receiving module 448 may be substantially similar to the feature & outcome receiving module 312 of FIG. 3.

In some embodiments, the host device 421 may include a statistical analyzer 430. The statistical analyzer 430 may be configured to receive features and outcomes from the natural language processing system 432 and an image analysis from the image processing system 442 (e.g., the statistical analyzer 430 may be substantially similar to the statistical analyzer 322 of FIG. 3).

In some embodiments, the data structuring module 422 may have an optical character recognition (OCR) module (not pictured). The OCR module may be configured to receive an analog format of an unstructured textual report sent from a data repository 402 and perform optical character recognition (or a related process) on the report to convert it into machine-encoded text so that the natural language processing system 432 may perform NLP on the report. For example, the data repository 402 may transmit an image of a scanned medical report (e.g., a medical report of a driver or passenger involved in an accident) to the host device. The OCR module may convert the image into machine-encoded text, and then the converted report may be sent to the natural language processing system 432 for analysis. In some embodiments, the OCR module may be a subcomponent of the natural language processing system 432. In other embodiments, the OCR module may be a standalone module within the host device 421 or data structuring module 422. In still other embodiments, the OCR module may be located within the data repository 402 and may perform OCR on the unstructured, analog textual reports before they are sent to the host device 421 or data structuring module 422.

Host device 421 may further include storage 431 for storing features, outcomes, and driving behavior models. Driving behavior models may be loaded into active memory (e.g., memory 428 or memory 418) to process real-time input (e.g., data received from real-time data submission module 420) to determine a set of driving behaviors that an autonomous vehicle 412 should execute in light of real-time features (e.g., current driving conditions). The autonomous vehicle may receive the set of driving behaviors (e.g., when the set of driving behaviors are determined at the host device 421) via driving behavior receiving module 419.

While FIG. 4 illustrates a computing environment 400 with a single host device 421, a single data repository 402, and a single autonomous vehicle 412, suitable computing environments for implementing embodiments of this disclosure may include any number of host devices, data repositories, and autonomous vehicles. The various models, modules, systems, and components discussed in relation to FIG. 4 may exist, if at all, across a plurality of host devices, data repositories, and autonomous vehicles. For example, some embodiments may include two host devices and multiple data repositories. The two host devices may be communicatively coupled using any suitable communications connection (e.g., using a WAN, a LAN, a wired connection, an intranet, or the Internet). The first host device may include a natural language processing system configured to receive and analyze unstructured textual reports, and the second host device may include an image processing system configured to receive and analyze accident diagrams and images/videos of traffic, accidents, or damages.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5A:
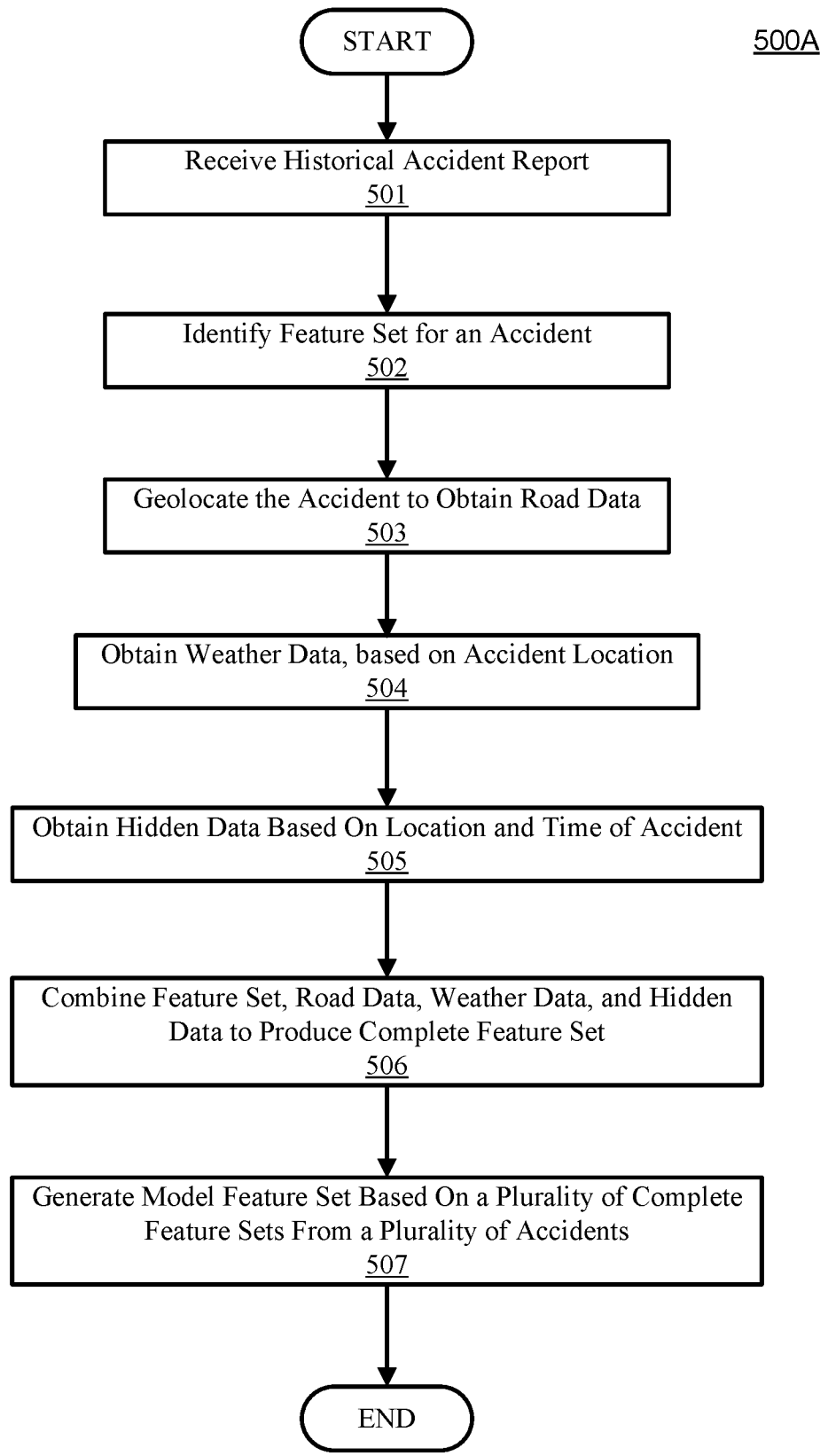
FIG. 5A illustrates a flowchart of a method for generating a model feature set, in accordance with embodiments of the present disclosure.

Referring now to FIG. 5A, shown is a method 500A for generating a model feature set, in accordance with embodiments of the present disclosure. At 501, a historical accident report is received. In embodiments, a historical accident reports may include, for example insurance company accident reports, police accident reports, etc. Historical accident reports may be received in response to a query (e.g., "pulled") of a data source, or they may be received automatically or at specific intervals from a data source (e.g., "pushed").

At 502, a feature set is identified for an accident. In embodiments, individual features may be identified using natural language processing techniques to parse and annotate a historical report, and the parsed terms may be statistically analyzed to determine which terms may correlate to an increase in the frequency or severity (e.g., an outcome) of an accident. A plurality of features identified in a particular historical report may be combined to create a feature set for an accident. Natural language processing techniques and statistical analyses are described in greater detail in the descriptions of FIGS. 1-3.

At 503, the accident may be geolocated to obtain road data. In embodiments, geolocation may include identifying the particular location of an accident using GPS coordinates, beacons, addresses included in historical accident reports, maps, etc. The geolocation of the accident may be used to query data repositories containing road data (e.g., information regarding the material composition of a particular road; whether road construction was being performed at an accident site; what type of construction was being performed; information regarding the maintenance/upkeep of the road; whether there were potholes, cracks, or other structural impairments; obstructions; etc.).

At 504, weather data may be obtained using the accident location. In embodiments, weather data may include temperatures, visibility conditions, precipitation conditions (e.g., snowing, raining, sleeting, hailing, etc.), the presence of water/ice on the road, dew point, humidity, wind speed and direction, etc. In embodiments, the obtained weather data may be limited to the particular time of the accident, or it may encompass a range of times (e.g., the weather data for the 24-hours leading up to the accident).

At 505, hidden data is obtained, based on the location and time of the accident. In embodiments, hidden data may include data relevant to generating a model feature set that is not collected by conventional methods for generating driving behavior models. Hidden data may include, for example, medical reports for individuals involved in an accident; driving records for individuals involved in an accident; vehicle sensor data from vehicles near, but not necessarily involved in, an accident; speed limits; or any other data relevant to the creation of robust models for generating driving behavior models that is not contained in reports of other data types discussed herein.

At 506, the feature set, road data, weather data, and hidden data are combined to produce a complete feature set. Combining the feature set with the road data, weather data, and hidden data may include further identifying features and/or feature sets within the road data, weather data, and hidden data. In embodiments, the feature sets, for a particular accident, from each data source are combined to produce the complete feature set.

At 507, a model feature set is generated, based on a plurality of complete feature sets obtained from a plurality of accidents. In embodiments, data and/or complete feature sets from a plurality of accidents having particular features may be combined to generate a robust model feature set. For example, the plurality of accidents used to generate the model feature set may all involve a particular intersection or road design, a particular make/model of vehicle, a particular demographic of driver, etc.

Figure 5B:
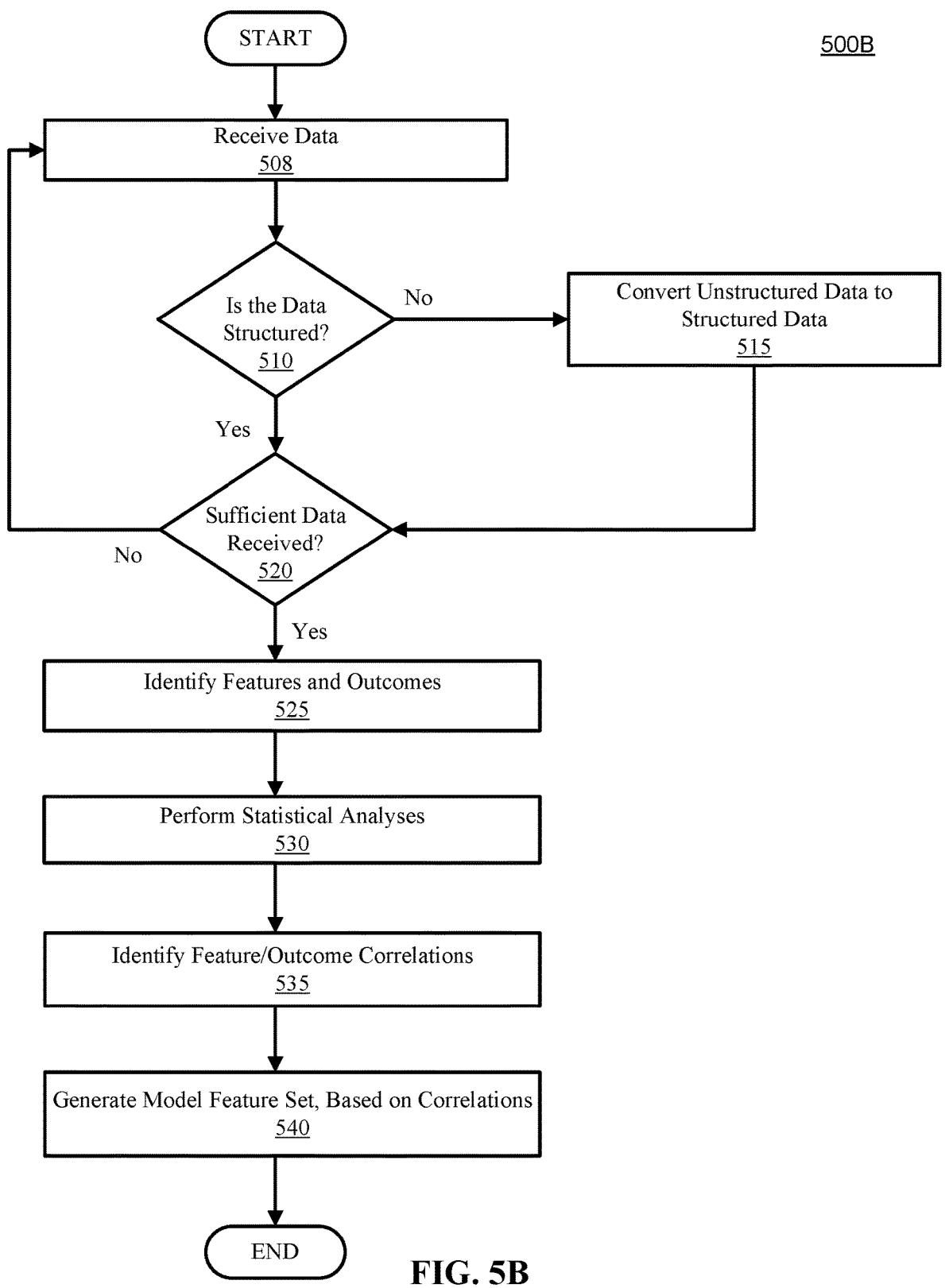
FIG. 5B illustrates a flowchart of a method for generating a model feature set, in accordance with embodiments of the present disclosure.

Referring now to FIG. 5B, shown is a method 500B for generating a model feature set, in accordance with embodiments of the present disclosure. At 508, data is received. Data may include, for example, data from any of the sources discussed in relation to FIGS. 1-4 (e.g., accident reports, weather reports, vehicle sensor data, geolocation data, road data, police reports, insurance reports, medical reports, "hidden" data, etc.). Data may be received in response to a query (e.g., "pulled") of a data source, or data may be received automatically or at specific intervals from a data source (e.g., "pushed").

At 510, it is determined whether the received data is structured. Structured data may include machine-readable data or any data that does not require further processing to be utilized in a statistical analysis or the generation of a driving behavior model.

If, at 510, it is determined that received data is not structured, unstructured data may be converted into structured data at 515. Techniques for converting unstructured data into structured data are discussed in detail in the descriptions of FIGS. 2-4 and may include, for example, natural language processing techniques, image processing techniques, optical character recognition, etc.

At 520, it may be determined if sufficient data has been received. For example, in order to build robust and effective models, a certain volume of data (e.g., a certain number of data entries for a number of data points in a statistical analysis) or a particular sample size may be required. A threshold for determining whether a sufficient amount of data has been received may be employed, and the threshold may be based on user input or standards for statistical analyses that are well-known in the art.

If, at 520, it is determined that sufficient data has been received, features and outcomes may be identified at 525. Features may include the conditions that lead or contribute to the occurrence of an accident, as described herein. Outcomes may include the results of an accident (e.g., the type and amount of damages).

At 530, statistical analyses are performed to characterize the features and outcomes. Techniques for performing statistical analyses (e.g., clustering techniques), are described in greater detail herein.

At 535, correlations between the features and the outcomes are identified, as described herein.

At 540, a model feature set may be generated, based on the correlations identified. For example, as described herein, features (e.g., stormy weather, the presence of potholes, driver age, vehicle type, etc.) may correlate to an increased (or decreased) risk of the occurrence of an accident, and may further correlate to an increased (or decreased) level of severity regarding outcomes (e.g., economic damages, property damages, medical damages, fatalities, etc.) A model feature set may include rules, algorithms, neural network configurations/parameters, etc. representing these correlations. As such, a model feature set may be utilized to perform, for example, a computer simulation of an accident according to a list of selected features or to determine which driving behaviors an autonomous vehicle should execute to maximize the likelihood of avoiding an accident, given a set of unalterable real-time features (e.g., driving conditions).

In embodiments, a model feature set may be dynamic. In other words, the model feature set may update "on-the-fly" as more data is received and processed to produce more accurate correlation representations from the increased sample size.

Figure 6:
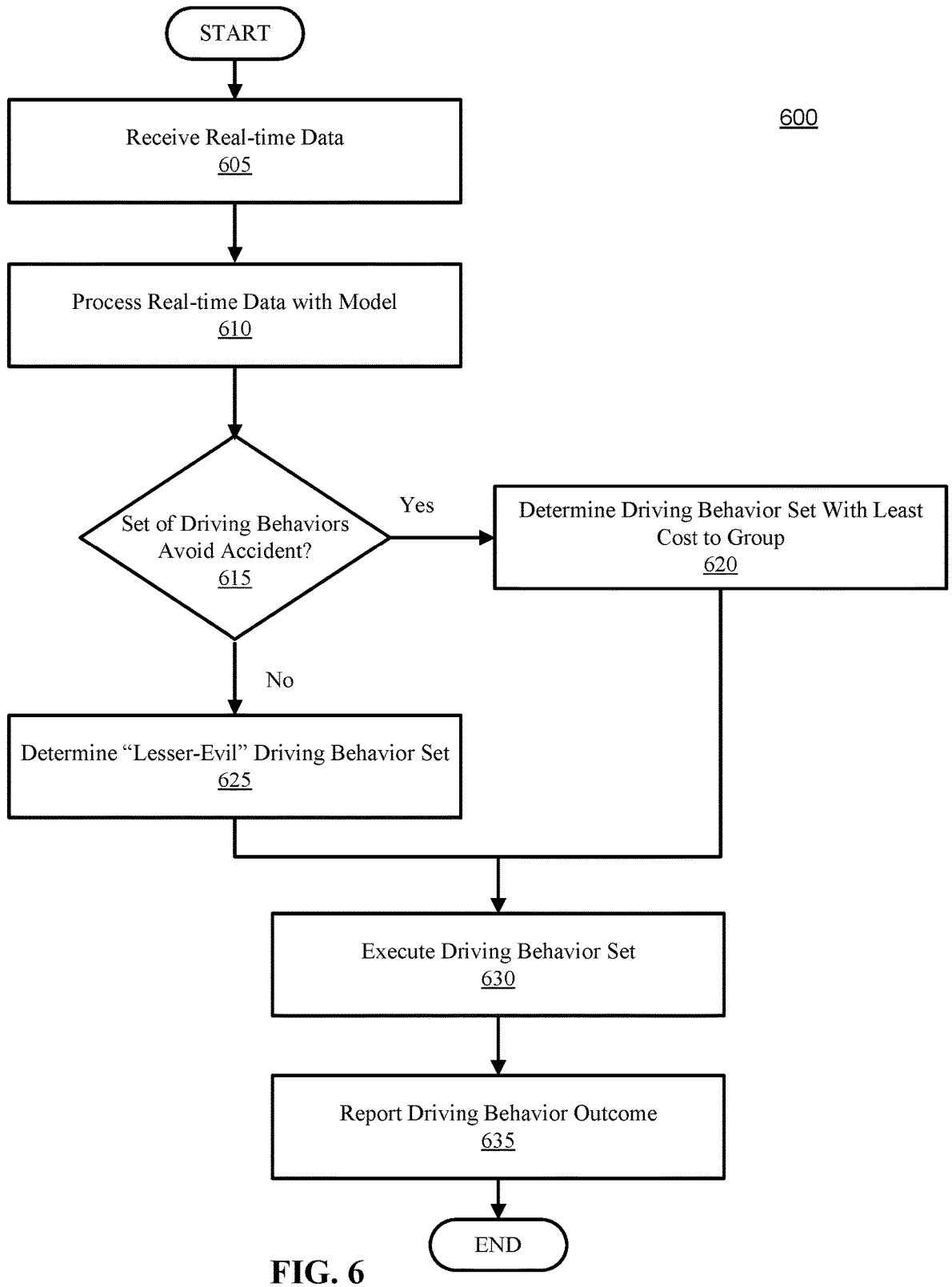
FIG. 6 illustrates a flowchart of a method for controlling an autonomous vehicle, in accordance with embodiments of the present disclosure.

Referring now to FIG. 6, illustrated is a flowchart of a method 600 for controlling an autonomous vehicle, in accordance with embodiments of the present disclosure. In embodiments, method 600 may be performed, for example, subsequent to method 500A or 500B. At 605, real-time data is received. Real-time data may include current vehicle sensor data from an autonomous vehicle and nearby vehicles, GPS location (or other positioning technology, such as beacons) tracking data for the autonomous vehicle and nearby vehicles, weather data, road data, map data (e.g., intersection layouts), and any other data that can be obtained, in real-time, to accurately assess which outcomes are likely to occur from each of a set of driving behaviors the autonomous vehicle may execute.

At 610, the real-time data is processed using a model, such as a model generated using method 500A or 500B. Processing the real-time data with the model may include accounting for current driving conditions (e.g., defining model features to eliminate variables within the model) to identify a set of possible driving behaviors (e.g., a feature combination where the undefined or alterable features are driving behaviors).

At 615, it is determined whether a particular combination of features (e.g., a set driving behaviors) will avoid an accident. Such a determination may be made by identifying one or more sets of possible driving behaviors and evaluating the outcomes associated with those driving behavior sets when the driving conditions (e.g., unalterable model features) are defined by, or match, the real-time data received at 605. Each set may be evaluated to determine whether the particular set is likely to avoid or incur an accident.

If, at 615, it is determined that one or more sets of driving behaviors will avoid an accident, then the set of driving behaviors may be ranked according to costs to a group at 620. A group may be defined by all the vehicles within a particular radius of an autonomous vehicle. Costs to a group may be evaluated by determining time efficiencies (e.g., which driving behavior set is likely to reduce, by the greatest margin, the overall travel time for the entire group), energy efficiencies (e.g., which driving behavior set is likely to reduce, by the greatest margin, the overall energy consumption of the group), etc.

If, at 615, it is determined that no set of driving behaviors is likely to avoid an accident, then a "lesser-evil" driving behavior set is determined. A "lesser-evil" driving behavior set may also be described as a "least-evil" driving behavior set. A "lesser-evil" driving behavior set may include the set of driving behaviors that imposes the least amount of damages to a group. The group may include one or more vehicles (as well as the vehicles' occupants), and the group may be defined by geographic area, radius centered on a vehicle, etc. Damages may be evaluated as described herein (e.g., economic, medical, property, etc.), and particular damages may be weighted or prioritized. For example, in embodiments, driving behaviors correlating to outcomes that include fatalities may be weighted so that fatalities are prioritized to be avoided over pure economic or property damages.

At 630, the driving behavior set is executed. The driving behavior set may include any combination of driving behaviors (e.g., decreasing/increasing speed, altering directions, applying brakes, applying an emergency brake, pulling off to the side of a road, changing gears, etc.). In embodiments, the execution of the driving behavior may be executed directly by the vehicle, or may be facilitated through various intermediaries. For example, an assisted-driving vehicle may provide audible messages containing driving behavior suggestions to a driver, a robot may be used to control a vehicle according to the driving behavior set, a set of driving behaviors may be displayed on a console or screen, etc.

At 635, the outcome of the executed driving behavior set is reported. Because the model necessarily operates on statistical correlations, the expected outcome may differ from the realized outcome. Therefore, reporting the outcome of the executed set of driving behaviors and incorporating that information back into the model may increase the accuracy of the model and enable a cognitive feedback loop that may be used in machine learning.

Figure 7:
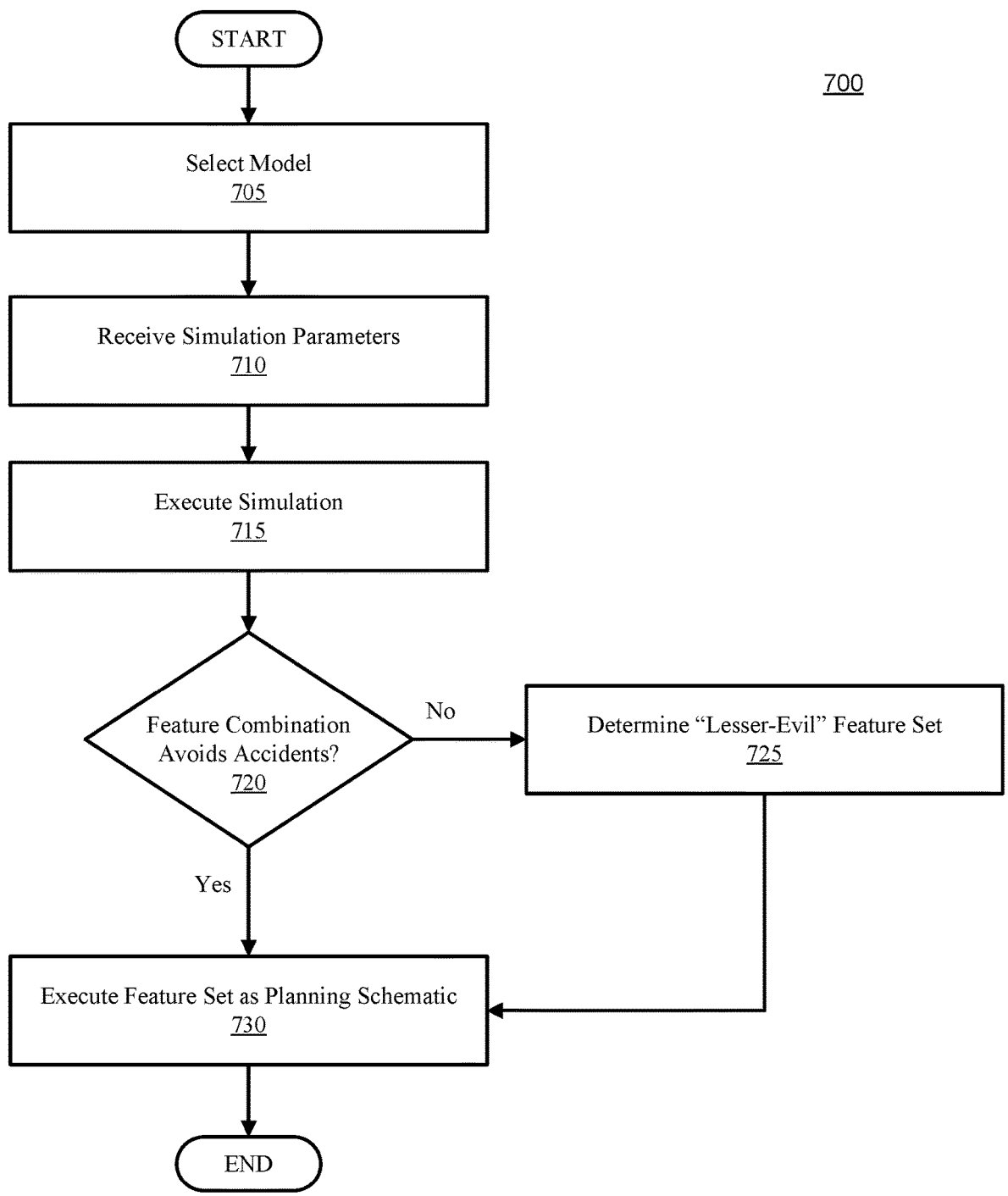
FIG. 7 illustrates a flowchart of a method for generating a planning schematic, in accordance with embodiments of the present disclosure.

Referring now to FIG. 7, illustrated is a flowchart of a method 700 for generating a planning schematic, in accordance with embodiments of the present disclosure. A planning schematic may include a design of a road, bridge, intersection, freeway interchange, etc., and/or it may include a schematic or plan for the distribution of services that may be needed when an accident occurs, such as emergency response services. At 705, a model is selected. A model may be, for example, a model generated using method 500A or 500B. In embodiments, multiple models may be generated from various sets of data; a user may select a particular model, or a computer system may automatically select an appropriate model based on desired outputs.

At 710, simulation parameters are received. Receiving simulation parameters may include defining particular features of the model. For example, weather conditions may be defined, the number and type of vehicles involved in the simulation may be defined, speed limits may be defined, driver and/or passenger demographics may be defined, etc.

At 715, the simulation is executed. Executing the simulation may include executing multiple discrete simulations in parallel to account for undefined parameters with multiple possible definitions. Simulation outputs may be based on the correlations of features to outcomes, as described herein.

At 720, it is determined whether the combination of features used to execute the simulation avoided an outcome that included at least one accident.

If, at 720, it was determined that the combination of features avoided accidents, then the set of features used to execute the simulation may be incorporated into a planning schematic at 730. In embodiments, a planning schematic may include defined variables regarding the layout of a road, bridge, intersection, freeway interchange, etc. (e.g., the number of roads/lanes converging at an intersection, speed limits, presence of traffic signals, whether the intersection is a roundabout, road composition materials, etc.).

If, at 720, it is determined that no combination of features will avoid accidents, then a "lesser-evil" feature set may be determined at 725. A "lesser-evil" feature set may be a feature set where the severity of the outcomes generated by the simulation are mitigated as much as possible. Outcome severities may be evaluated as described herein (e.g., outcome severities may consider economic, property, medical, and other damages) and may be weighted or prioritized as described herein. In embodiments, the "lesser-evil" feature set may include features relating to road composition, road design, intersection or interchange design, etc. that reduce the number and severity of outcomes as much as possible. In other embodiments, the "lesser-evil" feature set may include a map of emergency services distribution where the services are positioned at points that minimize response times for the mapped areas. In some embodiments, the distribution of emergency services may consider the real-time availability of emergency response resources that are already responding to an emergency (e.g., emergency services that are unavailable due to their response to an on-going emergency, such as a flood, accident, fire, or other emergency event). "Lesser-evil" feature sets may be incorporated into planning schematics or maps at 730.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Referring now to FIG. 8, shown is a high-level block diagram of an example computer system (e.g., computer) 801 that may be configured to perform various aspects of the present disclosure, including, for example, methods 500A/500B/600/700, described in FIGS. 5A-7, respectively. The example computer system 801 may be used in implementing one or more of the methods or modules, and any related functions or operations, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 805.

Although the memory bus 803 is shown in FIG. 8 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for creating driving behavior models, the method comprising:
    identifying a first feature set for an accident based on one or more historical accident reports;
    geolocating the accident to obtain road data for a location of the accident;
    obtaining weather data for the accident based on the accident location;
    obtaining hidden data for the accident based on the accident location and the time of the accident;

combining the first feature set with the road data, weather data, and hidden data to produce a complete feature set for the accident;

generating a model feature set based on a combination of the complete feature set and a plurality of other complete feature sets produced based on historical accident reports for a plurality of other accidents;

determining, based on a combination of the first feature set and the hidden data, a severity of one or more accident outcomes;

determining that a set of driving behavior features from the first feature set does not avoid an accident; and identifying a subset of driving behavior features from within the set of driving behavior features that lead to a least severe accident outcome.

2. The method of claim 1, further comprising applying the subset of driving behavior features to control a vehicle.

3. The method of claim 1, wherein the model feature set is used to control a vehicle.

4. The method of claim 1, wherein the model feature set is used to conduct a traffic simulation.

5. The method of claim 1, wherein historical accident reports include police reports and insurance company reports.

6. The method of claim 1, wherein hidden data includes vehicle sensor reports, nearby vehicle sensor reports, driver cohort data, speed limit data, road composition data, traffic reports, medical reports, and vehicle repair reports.

7. A system for creating driving behavior models, the system comprising:

a memory with program instructions stored thereon; and a processor in communication with the memory, wherein the processor, when executing the program instructions, performs the method comprising:

identifying a first feature set for an accident based on one or more historical accident reports;

geolocating the accident to obtain road data for a location of the accident;

obtaining weather data for the accident based on the accident location;

obtaining hidden data for the accident based on the accident location and the time of the accident;

combining the first feature set with the road data, weather data, and hidden data to produce a complete feature set for the accident;

generating a model feature set based on a combination of the complete feature set and a plurality of other complete feature sets produced based on historical accident reports for a plurality of other accidents;

determining, based on a combination of the first feature set and the hidden data, a severity of one or more accident outcomes;

determining that a set of driving behavior features from the first feature set does not avoid an accident; and identifying a subset of driving behavior features from within the set of driving behavior features that lead to a least severe accident outcome.

8. The system of claim 7, wherein the method further comprises applying the subset of driving behavior features to control a vehicle.

9. The system of claim 7, wherein the model feature set is used to control a vehicle.

10. The system of claim 7, wherein the model feature set is used to conduct a traffic simulation.

11. The system of claim 7, wherein historical accident reports include police reports and insurance company reports.

12. The system of claim 7, wherein hidden data includes vehicle sensor reports, nearby vehicle sensor reports, driver cohort data, speed limit data, road composition data, traffic reports, medical reports, and vehicle repair reports.

13. A computer program product for creating driving behavior models, the computer program product comprising a computer readable storage medium having program instructions embodied therewith, the program instructions, when executed by a device, cause the device to perform a method comprising:

identifying a first feature set for an accident based on one or more historical accident reports;

geolocating the accident to obtain road data for a location of the accident;

obtaining weather data for the accident based on the accident location;

obtaining hidden data for the accident based on the accident location and the time of the accident;

combining the first feature set with the road data, weather data, and hidden data to produce a complete feature set for the accident;

generating a model feature set based on a combination of the complete feature set and a plurality of other complete feature sets produced based on historical accident reports for a plurality of other accidents;

determining, based on a combination of the first feature set and the hidden data, a severity of one or more accident outcomes;

determining that a set of driving behavior features from the first feature set does not avoid an accident; and identifying a subset of driving behavior features from within the set of driving behavior features that lead to a least severe accident outcome.

14. The computer program product of claim 13, wherein the program instructions further cause the device to apply the subset of driving behavior features to control a vehicle.

15. The computer program product of claim 13, wherein the program instructions further cause the device to control a vehicle using the model feature set.

16. The computer program product of claim 13, wherein the program instructions further cause the device to conduct a traffic simulation using the model feature set.

17. The computer program product of claim 13, wherein hidden data includes vehicle sensor reports, nearby vehicle sensor reports, driver cohort data, speed limit data, road composition data, traffic reports, medical reports, and vehicle repair reports.

* * * * *